(12) United States Patent
Yoo (10) Patent No.: US 11,830,493 B2
(45) Date of Patent: ***Nov. 28, 2023

(54) METHOD AND APPARATUS WITH SPEECH PROCESSING

(71) Applicant: Samsung Electronics Co., Ltd., Suwon-si (KR)

(72) Inventor: Sanghyun Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,452

(22) Filed: Oct. 25, 2022

(65) Prior Publication Data

US 2023/0051625 A1   Feb. 16, 2023

Related U.S. Application Data

(63) Continuation of application No. 16/797,069, filed on Feb. 21, 2020, now Pat. No. 11,508,369.

(30) Foreign Application Priority Data

Oct. 10, 2019   (KR) .......................... 10-2019-0125597

(51) Int. Cl.
*G10L 15/22* (2006.01)
*G10L 15/30* (2013.01)

(52) U.S. Cl.
CPC ............. *G10L 15/22* (2013.01); *G10L 15/30* (2013.01); *G10L 2015/223* (2013.01); *G10L 2015/228* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 10,332,508 | B1 * | 6/2019 | Hoffmeister | G06N 3/08 |
| 11,508,369 | B2 * | 11/2022 | Yoo | G10L 15/04 |
| 2018/0114522 | A1 * | 4/2018 | Hall | G10L 13/047 |
| 2020/0160838 | A1 * | 5/2020 | Lee | G10L 15/26 |
| 2021/0110820 | A1 * | 4/2021 | Yoo | G10L 15/22 |
| 2023/0051625 | A1 * | 2/2023 | Yoo | G10L 15/30 |

FOREIGN PATENT DOCUMENTS

| | | |
|---|---|---|
| CN | 103458056 A | 12/2013 |
| CN | 103458056 B | 4/2017 |
| JP | 2015-230384 A | 12/2015 |
| KR | 10-1122591 B1 | 3/2012 |
| KR | 10-2018-0055189 A | 5/2018 |

OTHER PUBLICATIONS

Serdyuk et al., "Towards End-To-End Spoken Language Understanding," Feb. 23, 2018, 5 pages.

* cited by examiner

*Primary Examiner* — Marcus T Riley
(74) *Attorney, Agent, or Firm* — NSIP Law (57) ABSTRACT

Disclosed is a method and apparatus for processing a speech. The method includes obtaining context information from a speech signal of a user using a neural network-based encoder, determining, based on the context information, attention information corresponding to a segment included in the speech signal, and recognizing, based on the attention information, the segment by decoding a portion of the context information identified as corresponding to the segment.

20 Claims, 5 Drawing Sheets

METHOD AND APPARATUS WITH SPEECH PROCESSING

CROSS-REFERENCE TO RELATED APPLICATIONS

This application is a Continuation Application of U.S. patent application Ser. No. 16/797,069 filed on Feb. 21, 2020, which claims the benefit under 35 USC § 119(a) of Korean Patent Application No. 10-2019-0125597 filed on Oct. 10, 2019, in the Korean Intellectual Property Office, the entire disclosures of which are all incorporated herein by reference for all purposes.

BACKGROUND

1. Field

The following description relates to a method and apparatus with speech processing.

2. Description of Related Art

Speech recognition technology may be used to recognize a user's speech. The recognized speech of the user may be converted into text through speech recognition. Natural language understanding (NLU) is a technology for allowing a machine to understand one or more languages, e.g., in a conversational context. With the development of speech recognition and NLU technologies, users have a growing need for voice commands to control devices or act as agents.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a speech processing method includes obtaining context information from a speech signal of a user using a neural network-based encoder, determining intent information of the speech signal based on the context information, determining, based on the context information, attention information corresponding to a segment included in the speech signal, and determining, based on the attention information, a segment value of the segment by recognizing, using a decoder, a portion of the context information identified as corresponding to the segment.

In response to a determination that the speech signal may include a plurality of segments, determining segment values of the segments by recognizing, in parallel using a plurality of decoders, portions of the context information identified as corresponding to the respective segments based on attention information respectively corresponding to the plurality of segments.

The speech processing method may further include determining type information of the segment included in the speech signal based on the context information. The determining of the segment value of the segment may further include recognizing the identified portion based on the type information of the segment.

The determining of the segment value of the segment may further include recognizing the identified portion based on the intent information of the speech signal.

Type information of the segment may be determined based on the context information and the intent information of the speech signal.

The intent information may be further determined based on type information of one or more segments included in the speech signal.

A plurality of segments included in the speech signal may be sequentially identified by a segment classifier provided in the form of a decoder.

The determining of the segment value of the segment may include sequentially determining segment values of the respective segments in response to the segments being sequentially identified by the segment classifier provided in the form of a decoder.

The speech processing method may further include performing an operation corresponding to the intent information based on the segment value of the segment and the type information.

A non-transitory computer-readable storage medium may store instructions that, when executed by a processor, cause the processor to perform the speech processing method above.

In another general aspect, a speech processing apparatus includes one or more processors. The one or more processors may be configured to obtain context information from a speech signal of a user using a neural network-based encoder, determine intent information of the speech signal based on the context information, determine, based on the context information, attention information corresponding to a segment included in the speech signal, and determine, based on the attention information, a segment value of the segment by recognizing, using a decoder, a portion of the context information identified as corresponding to the segment.

In response to a determination that the speech signal includes a plurality of segments, the one or more processors may be configured to determine segment values of the segments by recognizing, in parallel using a plurality of decoders, portions of the context information identified as corresponding to the respective segments based on attention information respectively corresponding to the plurality of segments.

The one or more processors may be further configured to determine type information of the segment included in the speech signal based on the context information, and determine, based on the type information of the segment, the segment value of the segment by recognizing the identified portion.

The one or more processors may be further configured to determine, based on the intent information of the speech signal, the segment value of the segment by recognizing the identified portion.

Type information of the segment may be determined based on the context information and the intent information of the speech signal.

The one or more processors are further configured to determine the intent information of the speech signal based on type information of one or more segments included in the speech signal.

A plurality of segments included in the speech signal may be sequentially identified by a segment classifier provided in the form of a decoder.

The one or more processors may be further configured to sequentially determine segment values of the respective segments in response to the segments being sequentially identified by the segment classifier provided in the form of a decoder.

The one or more processors may be further configured to perform an operation corresponding to the intent information based on the segment value of the segment and the type information.

In another general aspect, a speech processing method includes determining context information from a speech signal of a user, determining, based on the context information, intent information and segments of the speech signal, determining attention information corresponding to the segments excluding the intent information, determining, based on the attention information, segment values of the segments, and executing the intent information for the segment values.

The segment values may be determined in parallel using a plurality of decoders.

The segment values may be determined based on the intent information.

Each of type information of the segments may be determined based on the context information and the intent information.

The intent information may be further determined based on type information of one or more of the segments.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains and after an understanding of this disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Hereinafter, examples are described in detail with reference to the accompanying drawings. The following specific structural or functional descriptions are exemplary to merely describe the examples, and the scope of the examples is not limited to the descriptions provided in the present specification. Like reference numerals in the drawings denote like elements, and a known function or configuration will be omitted herein.

Figure 1:
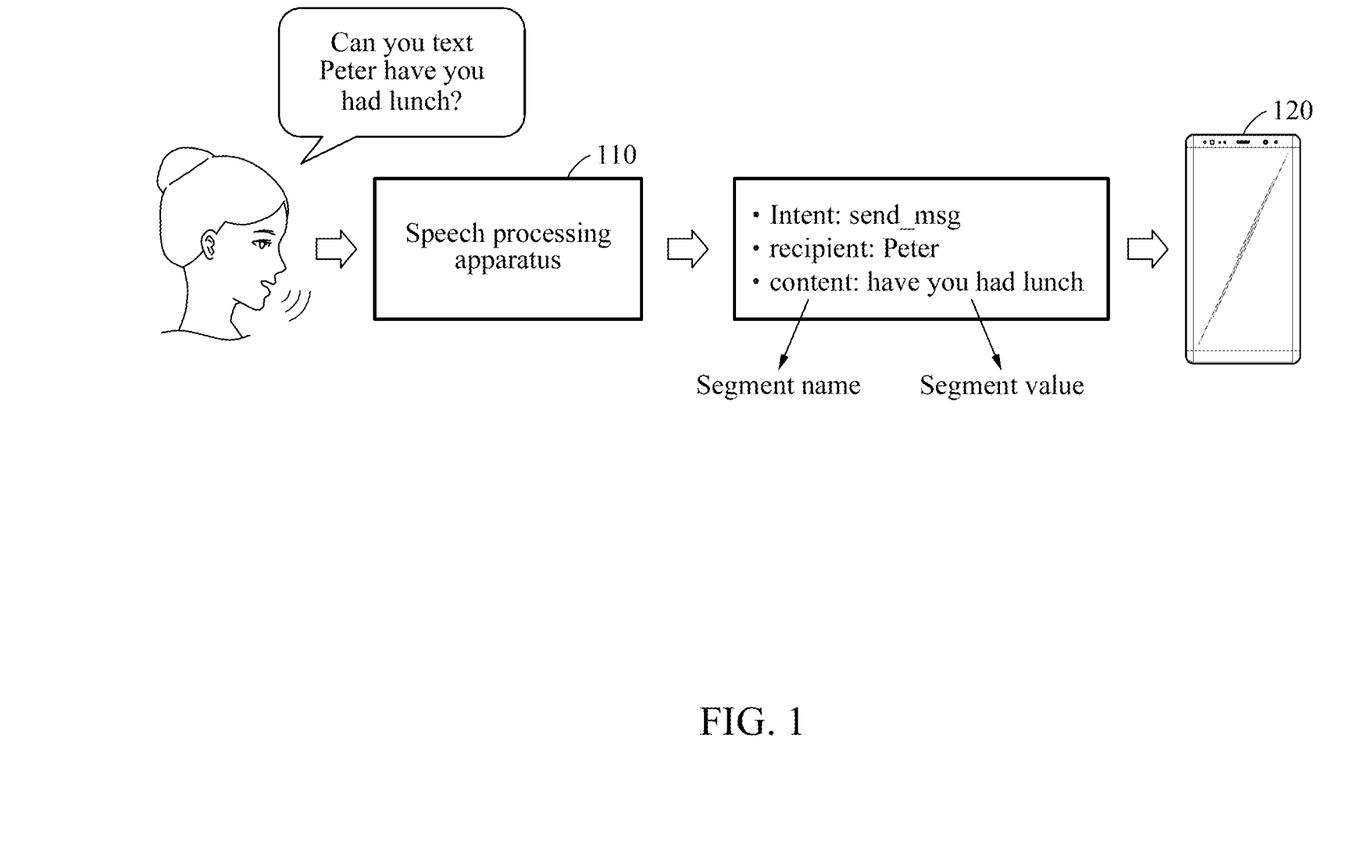
FIG. 1 illustrates an example of processing a natural language based on a speech processing apparatus.

FIG. 1 illustrates an example of processing a natural language based on a speech processing apparatus.

FIG. 1 depicts an example of a controlling operation of an electronic device 120 based on a user's determined intent, e.g., identified by a speech processing apparatus 110 from the user's captured speech signal.

The speech processing apparatus 110 determines segment (or slot) in a speech signal. The segment may include a segment name and segment value. The segment name included in the speech signal may include intent information, recipient information, and content information, for example. The intent information may indicate the user's intention from the speech signal uttered by the user. Here, the intent information may refer to an operation that the user desires to perform through an utterance, and may include various operations that may be performed by the electronic device 120. The operations of the intent information that may be performed may include sending a message, checking a received message, making a call, checking/creating/editing/deleting a schedule, playing a song/video, ordering goods in online market, and the like. In an example, the segment value may include a phrase or word corresponding to a keyword included in the speech signal to perform the operation corresponding to the user intent. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In the example of sending a text message depicted in FIG. 1, "Peter" corresponds to a recipient information and "Have you had lunch" corresponds to the content information are segments. In other words, when a voice command of the user is regarded as a command for execution of a function in a program, the intent information is the name of a function to be executed, and the segment value is the parameter passed to the function.

The speech processing apparatus 110 uses an encoder-decoder model to determine the intent information of the speech signal and the segment. The encoder-decoder model is a neural network including a plurality of layers and includes an encoder and a decoder. The encoder may determine context information with respect to the provided speech signal of the user. The context information may be a vector sequence, which may be a summary information containing the meaning of the speech signal. In general, a decoder determines a sentence sequence corresponding to a speech recognition result based on context information. Words may be sequentially generated to determine the sentence sequence. Since, in an example, a word generated in a current inference or run of the decoder is input again into the decoder to generate a word of a subsequent inference or run of the decoder, the time for performing speech recognition increases, and the recognition accuracy may decrease. Thus, when speech recognition is partially performed only with respect to a keyword for performing the operation corresponding to the user intent in the speech signal, the time for performing speech recognition decreases, and the recognition accuracy improves.

To achieve the foregoing, an attention mechanism may be applied to the encoder-decoder model. For example, a portion corresponding to a segment in the context information is identified based on attention information corresponding to the segment, and the segment value of the segment is determined by recognizing only the identified portion using the decoder. The attention information is information indicating a portion of context information desiring of attention for the decoder to output a segment value of the segment as a recognition result.

For ease of description, in an example, it is assumed that a user utters: "Can you text Peter have you had lunch?," as in the example of FIG. 1. The speech processing apparatus 110 determines intent information of sending a message from the speech signal corresponding to the utterance of the user, and determines segments "recipient: Peter" and "content: have you had lunch." The electronic device 120 performs an operation corresponding to the information determined by the speech processing apparatus 110. For example, the electronic device 120 sends a text message: "have you had lunch" to Peter.

The electronic device 120 may be a device that the user desires to control, and may include in or be representative of, various computing devices such as a smart phone, a tablet computer, a laptop computer and a personal computer, various wearable device such as a smart watch and a smart eyeglass, various home appliances such as a smart speaker, a smart TV, and a smart refrigerator, a smart vehicle, and a smart kiosk, as non-limiting examples. Accordingly, through the speech processing apparatus 110, an artificial intelligence (AI) assistant configured to control the electronic device 120 with a voice command of the user may be implemented.

In FIG. 1, an example in which the speech processing apparatus 110 and the electronic device 120 are provided as separate devices and communicate with each other through wired and/or wireless networks are also illustrated. In this example, the speech signal of the user may be transmitted to the speech processing apparatus 110, for example, a remote server and information determined by the speech processing apparatus 110 transmitted to the electronic device 120, such that the electronic device 120 performs a predetermined operation. However, the above example is provided only for ease of description, and examples are not limited thereto. The description herein also similarly applies to an example in which the speech processing apparatus 110 and the electronic device 120 are implemented as a single device.

Hereinafter, the operation of the speech processing apparatus 110 will be described in further detail.

Figure 2:
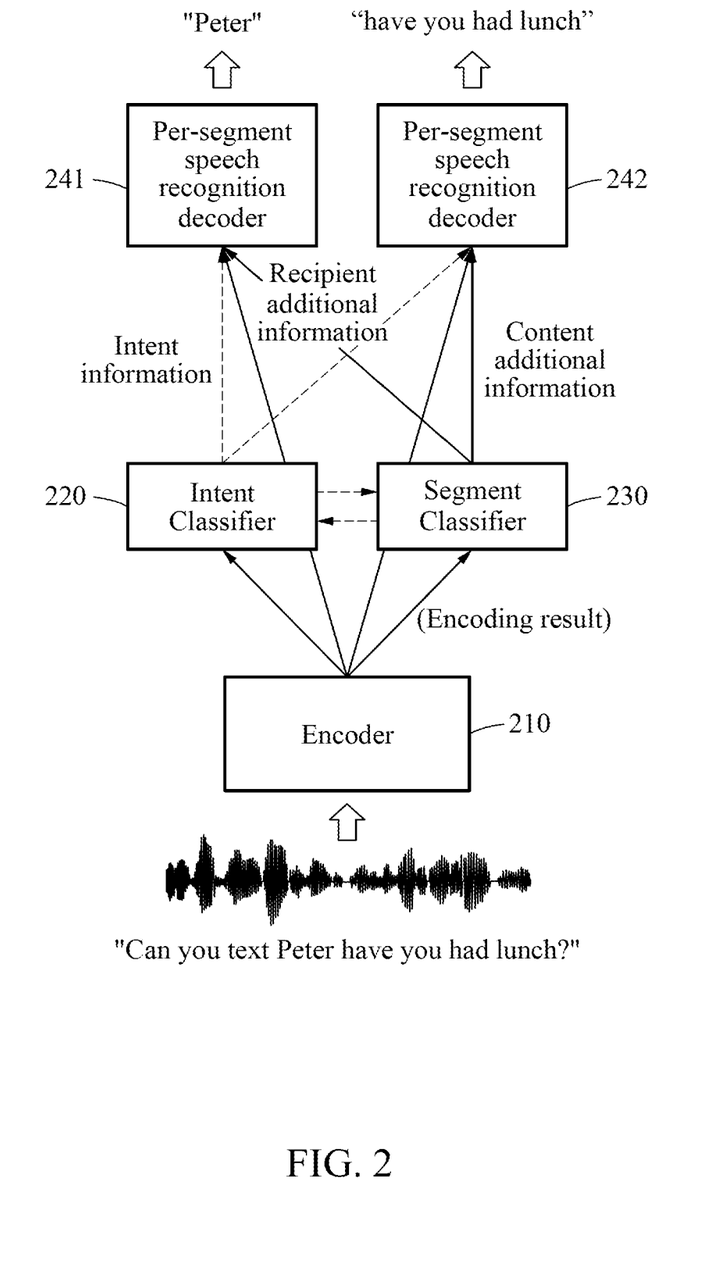
FIGS. 2 and 3 illustrate examples of operations of speech processing apparatuses.
Figure 3:
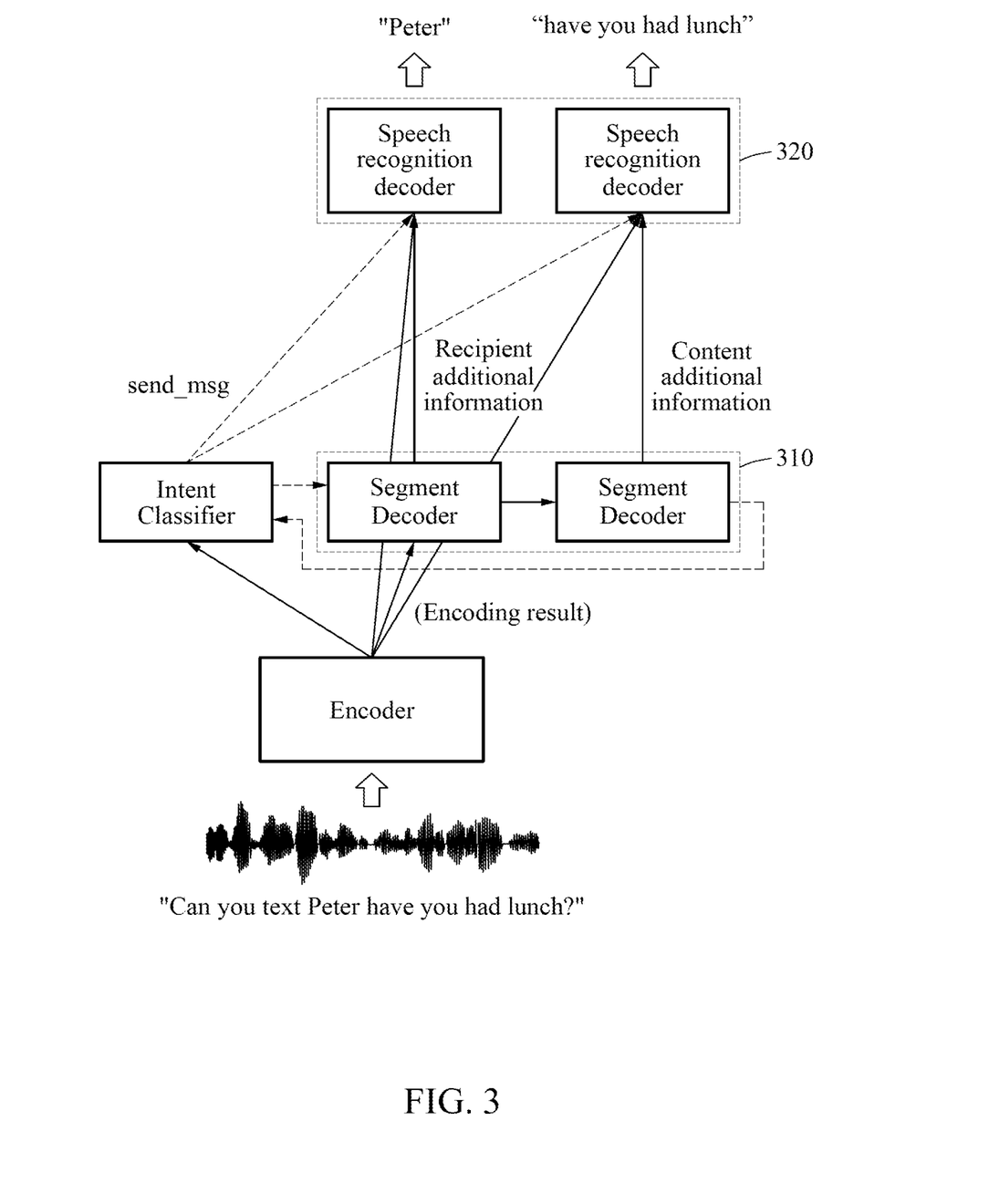

FIGS. 2 and 3 illustrate examples of operations of speech processing apparatuses.

Referring to FIG. 2, a speech processing apparatus includes an encoder 210, an intent classifier 220, a segment classifier 230, and speech recognition decoders 241 and 242, for example.

The encoder 210 may output context information as an encoding result from a captured or stored speech signal of a user. In this example, the encoder 210 may output the context information by receiving the entire speech signal in response to completion of an utterance of the user or output corresponding context information in real-time each time a speech signal is partially received during the utterance of the user.

The intent classifier 220 may determine intent information of the speech signal based on the context information. For example, the intent classifier 220 may be a neural network configured to determine the intent information of the speech signal from the context information. The segment classifier 230 may be a classifier provided in the form of softmax layer(s) or functions, for example.

The segment classifier 230 may identify one or more segments included in the speech signal based on the context information. The segment classifier 230 may determine the type information of a segment included in the speech signal based on the context information. For example, the segment classifier 230 may be a classifier provided in the form of a sigmoid capable of multi-selection. The type information is information indicating the meaning of a segment value of the segment, and may include, for example, a recipient or content in a case of sending a message as shown in FIG. 1.

Further, the segment classifier 230 may determine attention information corresponding to the segment included in the speech signal based on the context information. If the speech signal includes a plurality of segments, the segment classifier 230 may determine attention information corresponding to each segment.

In an example, the intent classifier 220 may determine the intent information of the speech signal based on both the context information from the encoder 210 and the type information of the segment determined by the segment classifier 230. For example, in response to the segment classifier 230 determining type information of segments corresponding to a recipient, message content, and a sending time, for example, the intent information of "sending a message" may be determined relatively quickly with relatively high accuracy further based on the type information of the segments.

In general, it is a verb in a sentence uttered by the user that may best indicate an intent of the user, with segments being determinable from the remaining constituents of the sentence. For example, in a language where a verb may be included or represented at the end of a sentence, like Korean, a user's intent is included or represented in the rear portion of an utterance. Thus, in an example of obtaining context information through real-time encoding performed each time a speech signal is received partially during the user utterance, the intent classifier 220 may determine the intent information of the speech signal further based on type information of the one or more segments determined by the segment classifier 230. In summary, type information of segments, determined by the segment classifier 230 based on linguistic characteristics, is transmitted to and utilized by the intent classifier 220.

In another example of obtaining context information by encoding the entire speech signal in response to completion of the user utterance, type information of segments, determined by the segment classifier 230 irrespective or independent of linguistic characteristics of the utterance, may be transmitted to and utilized by the intent classifier 220.

In some examples, the segment classifier 230 may determine the type information of the segment included in the speech signal based on the intent information determined by the intent classifier 220, in addition to the context information from the encoder 210. For example, in response to the intent classifier 220 determining intent information including "sending a message," the type information of the segments corresponding to a recipient and message content for sending a message is determined relatively quickly with relatively high accuracy further based on such intent information.

In a language where a verb is typically placed in the front portion of a sentence, like English, a user's intent may be included or represented at the front portion of an utterance. Thus, in an example of obtaining context information through real-time encoding performed each time a speech signal is partially received during the user utterance, the segment classifier 230 may additionally utilize the intent information of the speech signal determined by the intent classifier 220. In summary, the intent information of the speech signal determined by the intent classifier 220 based on linguistic characteristics may be transmitted to and utilized by the segment classifier 230.

In another example of obtaining context information by encoding the entire speech signal in response to completion of the user utterance, the intent information of the speech signal determined by the intent classifier 220 irrespective of linguistic characteristics may be transmitted to and utilized by the segment classifier 230.

The total number of speech recognition decoders implemented, e.g., including speech recognition decoders 241 and 242, may be equal to a total number of segments identified by the segment classifier 230, where each implemented decoder may output a segment value of a corresponding segment by performing recognition with respect to the segment. Each of the implemented speech recognition decoders may receive the context information from the encoder 210, and may receive additional information related to the corresponding segment from the segment classifier 230. Here, the additional information may include type information and attention information of the corresponding segment.

For example, the speech recognition decoder 241 may be a decoder corresponding to a segment with type information of "recipient." The speech recognition decoder 241 may identify a portion of the context information corresponding to the recipient segment based on the attention information and outputs "Peter" as a segment value of the segment by decoding the identified portion. Similarly, the speech recognition decoder 242 may be a decoder corresponding to a segment with type information of "content." The speech recognition decoder 242 may identify a portion of the context information corresponding to the content segment based on the attention information and outputs "have you had lunch" as a segment value of the segment by decoding the identified portion. As described above, the speech recognition decoders 241 and 242 each perform speech recognition with respect to only a single corresponding segment.

The speech recognition decoders 241 and 242 may determine segment values of the respective segments by decoding, in parallel, the portions of the context information identified as corresponding to the respective segments. In other words, the segment classifier 230 may identify portions desiring speech recognition. The speech recognition decoders 241 and 242 may perform speech recognition with respect to the identified portions in parallel, such that the portions subject to actual speech recognition in the entire speech signal may be minimized. The time for speech recognition may be minimized through parallel speech recognition with respect to the portions, which may improve the recognition accuracy over previous approaches. For example, the processing rate of the examples in this disclosure may increase when compared to an example where natural language processing is performed after speech recognition of the entire speech signal based on a cascading model in which a separate speech recognition engine and a natural language understanding (NLU) engine are connected in series. In addition, in the examples of this disclosure, a reduction in the overall accuracy caused by speech recognition errors being delivered to the NLU engine may be prevented.

In some examples, based on the type information of the segments, the speech recognition decoders 241 and 242 may further perform speech recognition with respect to the portions of the context information corresponding to respective segments. For example, based on the type information including "recipient", the speech recognition decoder 241 may further perform speech recognition with respect to a corresponding portion of the context information, such that a name of a person or a contact name stored in an electronic device is output.

Further, the speech recognition decoders 241 and 242 may perform speech recognition with respect to the portions of the context information corresponding to the respective segments further based on the intent information of the speech signal. For example, based on the intent information, including "sending a message," the speech recognition decoder 241 may improve the accuracy of a speech recognition with respect to the corresponding portion of the context information.

In FIG. 2, depending on the example, connections indicated by broken lines may be omitted.

Referring to FIG. 3, a speech processing apparatus includes a segment decoder 310 corresponding to a segment classifier provided in the form of a decoder. Attention information related to respective segments may be obtained through the segment decoder 310.

The segment decoder 310 may sequentially identify one or more segments included in a speech signal based on context information from an encoder. For example, the segment decoder 310 may identify a first segment in the speech signal and then identify a subsequent segment based on a result of the first identification. In this manner, the segments included in the speech signal are sequentially identified until a segment is no longer identified in the speech signal. The segment decoder 310 may be an autoregressive model.

In response to the segments included in the speech signal being sequentially identified by the segment decoder 310, additional information, for example, type information, attention information, and the like, of the identified segments may be transmitted to speech recognition decoders 320. The speech recognition decoders 320 may each perform speech recognition with respect to a corresponding segment each time additional segments are received from the segment decoder 310. Thus, the speech recognition decoders 320 may also sequentially perform speech recognition with respect to the segments.

As described with reference to FIG. 3, when the segment decoder 310 determines type information of the segments, intent information of the speech signal determined by an intent classifier may be additionally used. Further, when the intent classifier determines the intent information of the speech signal, the type information of the segments determined by the segment decoder 310 may be additionally used. Further still, when the speech recognition decoders 320 perform speech recognition with respect to the segments, the intent information of the speech signal and/or the type information of the segments may be additionally used.

In FIG. 3, connections indicated by broken lines may be omitted depending on an example.

Figure 4:
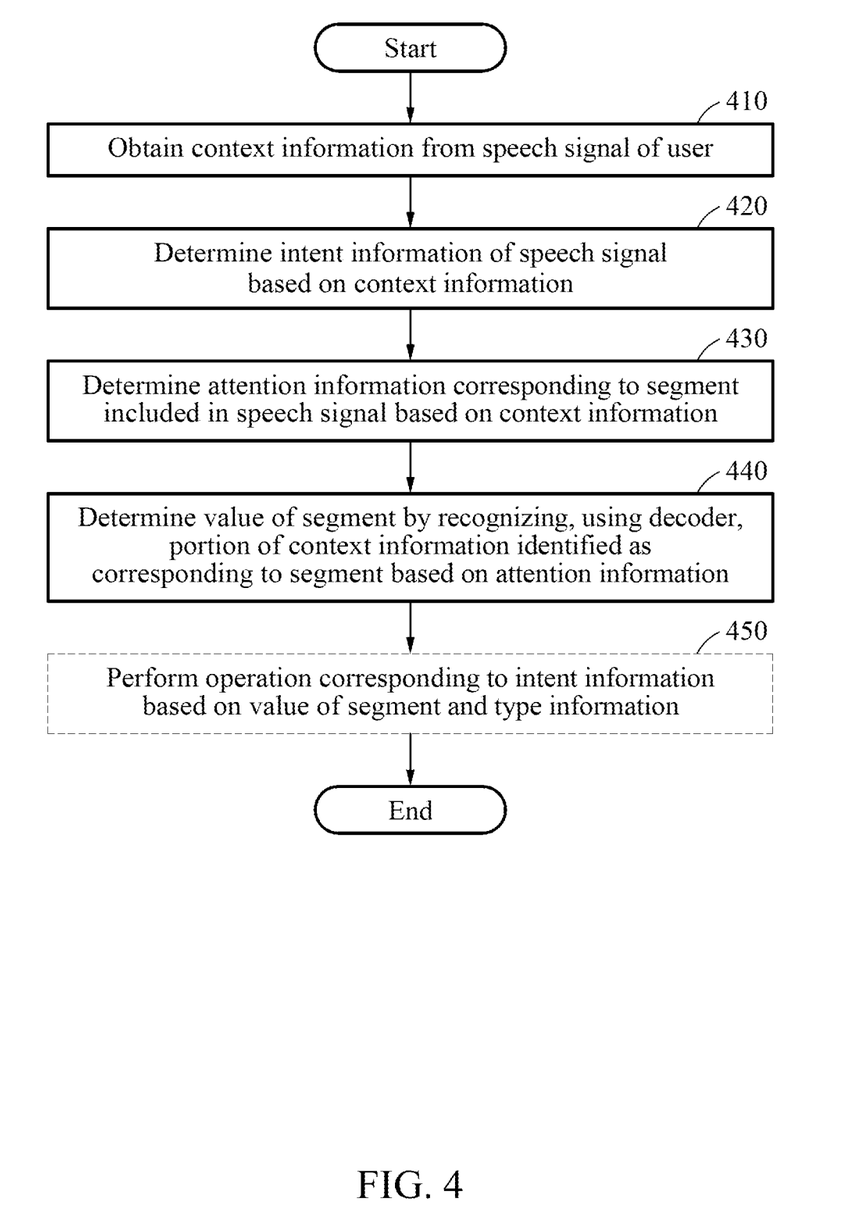
FIG. 4 illustrates an example of a speech processing method.

FIG. 4 illustrates an example of a speech processing method.

Referring to FIG. 4, a speech processing method performed by a processor included in a speech processing apparatus is illustrated.

In operation 410, the speech processing apparatus obtains context information from a speech signal of a user using a neural network-based encoder, for example. In response to a determination that the speech signal includes a plurality of segments, the speech processing apparatus may determine segment values of the segments by recognizing, in parallel using a plurality of decoders, portions of the context information identified as corresponding to the respective segments based on attention information respectively corresponding to the plurality of segments.

In operation 420, the speech processing apparatus determines the intent information of the speech signal based on the context information. The speech processing apparatus may further determine the intent information of the speech signal based on the type information of one or more segments included in the speech signal.

In operation 430, the speech processing apparatus determines attention information corresponding to a segment included in the speech signal based on the context information. If a segment classifier is provided in the form of a decoder, a plurality of segments included in the speech signal may be sequentially identified by the segment classifier provided in the form of a decoder.

Further, the speech processing apparatus may determine the type information of the segment included in the speech signal based on the context information. The speech processing apparatus may further determine the type information of the segment based on the intent information of the speech signal.

In operation 440, the speech processing apparatus determines a segment value of the segment by recognizing, using a decoder, a portion of the context information identified as corresponding to the segment based on the attention information.

The speech processing apparatus may further determine the segment value of the segment by recognizing the identified portion based on at least one of the type information of the segment and the intent information of the speech signal.

If the segment classifier is provided in the form of a decoder, the speech processing apparatus may sequentially determine the segment values of the respective segments in response to the segments being sequentially identified by the segment classifier provided in the form of a decoder.

In operation 450, the speech processing apparatus performs an operation corresponding to the intent information based on the segment value of the segment and the type information. In some examples, the operation corresponding to the intent information may be performed by an electronic device other than the speech processing apparatus.

The description provided with reference to FIGS. 1 through 3 applies to the operations of FIG. 4, and thus duplicate description will be omitted for conciseness.

Figure 5:
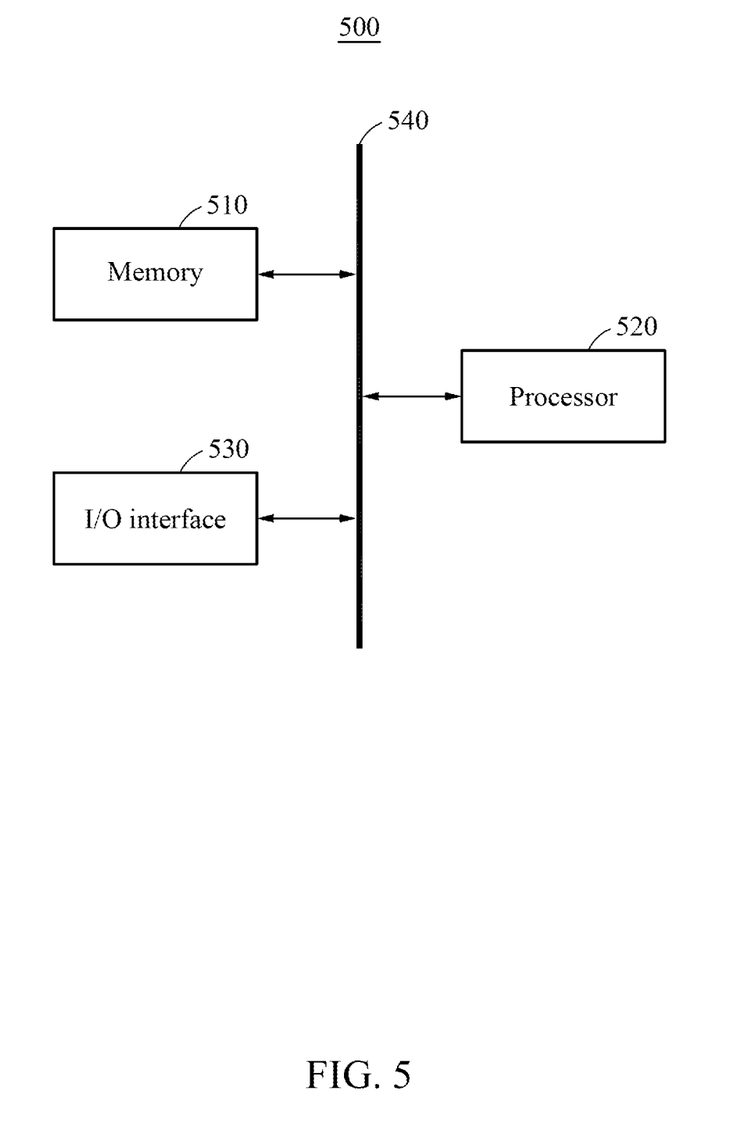
FIG. 5 illustrates an example of a speech processing apparatus.

FIG. 5 illustrates an example of a speech processing apparatus.

Referring to FIG. 5, a speech processing apparatus 500 includes a memory 510, a processor 520, and an input/output (I/O) interface 530. The memory 510, the processor 520, and the I/O interface 530 communicate with each other through a bus 540.

The memory 510 stores computer-readable instructions. The processor 520, by one or more processors, performs the operations described above in response to the instructions stored in the memory 510 being executed by the processor 520. The memory 510 is a volatile memory or a non-volatile memory.

The processor 520 is a device configured to execute the instructions or programs or to control the speech processing apparatus 500, and includes, for example, a central processing unit (CPU) and/or a graphics processing unit (GPU). The speech processing apparatus 500 may be connected to an external device, for example, an electronic device or a microphone, through the I/O interface 530, and exchanges data with the external device.

The processor 520 may obtain context information from a speech signal of a user using a neural network-based encoder, for example, determine intent information of the speech signal based on the context information, determine attention information corresponding to a segment included in the speech signal based on the context information, and determine a segment value of the segment by recognizing, using a decoder, a portion of the context information identified as corresponding to the segment based on the attention information.

A neural network used by the speech processing apparatus 500 to determine the intent information of the speech signal and the segment may be trained to determine ground-truth intent information and a ground-truth segment, in response to a training speech signal being provided.

In addition, the speech processing apparatus 500 may perform any or all of the operations described above.

The speech processing apparatuses, the speech processing apparatuses 110 and 500, and other apparatuses, units, modules, devices, and other components described herein with respect to FIGS. 1-5 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. An electronic device, comprising:
one or more processors configured to:
obtain context information from a speech signal of a user using a neural network-based encoder;

determine, based on the context information, attention information corresponding to a segment included in the speech signal; and recognize, based on the attention information, the segment by decoding a portion of the context information identified as corresponding to the segment.

2. The electronic device of claim 1, wherein the one or more processors are further configured to:
determine whether the speech signal includes a plurality of segments, and
determine a segment value of each of the plurality of segments by recognizing, in parallel using a plurality of decoders, portions of the context information identified as corresponding to a respective segment based on respective attention information of the respective segment.

3. The electronic device of claim 1, wherein the one or more processors are further configured to:
determine type information of the segment included in the speech signal based on the context information, and
determine, based on the type information of the segment, a segment value of the segment by recognizing the portion.

4. The electronic device of claim 1, wherein the one or more processors are further configured to determine, based on intent information of the speech signal, a segment value of the segment by recognizing the portion, and the intent information of the speech signal is determined based on the context information.

5. The electronic device of claim 1, wherein type information of the segment is determined based on the context information and intent information of the speech signal.

6. The electronic device of claim 1, wherein the one or more processors are further configured to determine intent information of the speech signal based on type information of one or more segments included in the speech signal.

7. The electronic device of claim 1, wherein respective segments included in the speech signal are sequentially identified by a segment classifier provided in a form of a decoder.

8. The electronic device of claim 7, wherein the one or more processors are further configured to sequentially determine segment values of the respective segments in response to the respective segments being sequentially identified by the segment classifier provided in the form of a decoder.

9. The electronic device of claim 1, wherein the one or more processors are further configured to perform an operation corresponding to intent information based on a segment value of the segment and type information.

10. The electronic device of claim 1, further comprising:
a memory storing instructions that when executed by the one or more processors, configure the one or more processors to perform the obtaining of the context information, the determining of the attention information, and the recognizing of the segment.

11. A method of operating an electronic device, comprising:
obtaining context information from a speech signal of a user using a neural network-based encoder;
determining, based on the context information, attention information corresponding to a segment included in the speech signal; and
recognizing, based on the attention information, the segment by decoding a portion of the context information identified as corresponding to the segment.

12. The method of claim 11, wherein in response to a determination that the speech signal includes a plurality of segments, the recognizing of the segment comprises determining segment values of each of the plurality of segments by recognizing, in parallel using a plurality of decoders, portions of the context information identified as corresponding to a respective segment based on attention information of the respective segment.

13. The method of claim 11, further comprising:
determining type information of the segment included in the speech signal based on the context information,
wherein the recognizing of the segment further comprises recognizing the portion based on the type information of the segment.

14. The method of claim 11, wherein the recognizing of the segment further comprises recognizing the portion based on intent information of the speech signal, and the intent information of the speech signal is determined based on the context information.

15. The method of claim 11, wherein type information of the segment is determined based on the context information and intent information of the speech signal.

16. The method of claim 11, wherein intent information is further determined based on type information of one or more segments included in the speech signal.

17. The method of claim 11, wherein respective segments included in the speech signal are sequentially identified by a segment classifier provided in a form of a decoder.

18. The method of claim 17, wherein the recognizing of the segment comprises sequentially determining segment values of the respective segments in response to the respective segments being sequentially identified by the segment classifier provided in the form of a decoder.

19. The method of claim 11, further comprising:
performing an operation corresponding to intent information based on a segment value of the segment and type information.

20. A non-transitory computer-readable storage medium storing instructions that, when executed by one or more processors, configure the one or more processors to perform the method of claim 11.

* * * * *